Feb. 15, 1944.  E. B. MIDDLETON ET AL  2,341,877
SUBLAYERS FOR FILM ELEMENTS AND PREPARATION THEREOF
Filed Oct. 7, 1940

Edmund B. Middleton
David M. McQueen
John R. Hill
INVENTORS

BY
Lynn B. Morris
ATTORNEY

Patented Feb. 15, 1944

2,341,877

UNITED STATES PATENT OFFICE 2,341,877

SUBLAYERS FOR FILM ELEMENTS AND PREPARATION THEREOF

Edmund B. Middleton, Woodbridge, N. J., David M. McQueen, Wilmington, Del., and John R. Hill, Parlin, N. J., assignors, by mesne assignments, to E. I. du Pont de Nemours & Company, Wilmington, Del., a corporation of Delaware Application October 7, 1940, Serial No. 360,202

16 Claims. (Cl. 95—9)

The invention relates to photographic elements and to methods of preparing the same and to compositions for use in preparing the same. More particularly it relates to photographic elements having a support composed of a fusible, water-insoluble, synthetic linear polymer having intralinear hetero atoms in the main polymer chain capable of formation into fibers showing by characteristic X-ray patterns orientation along the fiber axis, a sub layer composed of a film-forming colloid, and a radiation sensitive layer. It further relates to processes of making such elements and novel subcoating compositions therefor.

Heretofore photographic films have been made for the most part from cellulose derivatives and principally nitrocellulose and lower fatty acid esters of cellulose, including simple and mixed esters, ethers of cellulose and to a lesser extent from synthetic resins. These materials do not have the same physical properties and two rather serious problems are involved in their use as a support for radiation sensitive layers, particularly light sensitive and radiographic sensitive layers. One is to get the sensitive layers to anchor properly to the support and the other to obtain the requisite degree of flexibility. Each type of base material presents special problems.

It has been found that prior art sub-coating compositions and procedures are not entirely satisfactory for photographic elements having a support or base composed of a fusible water-insoluble, synthetic linear polymer having intralinear hetero atoms in the main polymer chain, said polymer being capable of formation into fibers showing by characteristic X-ray patterns orientation along the fiber axis, which for convenience are hereafter referred to as superpolymers.

This invention has for an object the production of photographic elements having improved adherence between radiation sensitive layers and film supports composed of superpolymers. A related object is to provide improved methods for applying radiation sensitive coatings to superpolymer film supports. A further object is to provide means for securing layers composed of reversible film-forming colloids to superpolymer film supports. A still further object is to provide new substratum coatings for superpolymer film supports. Other objects include the provision of new subbing compositions and technique. Still other objects will be apparent from the following description.

The above objects are accomplished by the following invention which in its broader aspects involves the preparation and use for subbing film supports or bases of solutions containing (1) a phenol, (2) a reversible film forming colloid, (3) an organic solvent for the phenol. Dispersing agents, stabilizers, water, solvents and diluents may be present, however. The solutions can be made by mixing the components in various ways in proportions so as to form a free flowing composition which dries or sets within a reasonable time and forms a thin layer on a support. In general it is desirable to dissolve the phenol in the solvent and disperse the colloid in water and mix the two solutions.

The solutions are deposited on superpolymer film bases in the same general manner and with the same types of apparatus used in depositing a subbing layer or layers on cellulosic film base until the layer or composite layer has a thickness within a few millionths of an inch of the range 0.000045 to 0.0002 inch.

In a more preferred aspect the invention involves the preparation and deposition on a polycarbonamide film base, including polyesteramides, of a subbing solution containing a mononuclear monohydric phenol of at least 7 carbon atoms, a reversible film forming colloid, water and a water-miscible organic solvent for said phenol, having a boiling point below 100° C.

The film bases used in accordance with this invention which are fusible, water-insoluble, synthetic linear polymers, including interpolymers, which contain intralinear hetero atoms in the main polymer chain, said polymer being capable of formation into fibers showing by characteristic X-ray patterns orientation along the fiber axis are described in Carothers applictaions, Serial Nos. 232,011 and 232,012.

Among the most useful of the synthetic linear superpolymers used for the film elements in accordance with this invention are those described in Patents 2,071,250, 2,071,252, 2,071,253 and 2,130,948. These high molecular weight polymers or superpolymers are obtained by reacting under suitable conditions with heat treatment bifunctional reactants and continuing the reaction until the superpolymeric or fiber-forming stage is reached. This stage is readily determined by touching the molten mass with a glass rod and drawing the rod quickly away. If the fiber-forming stage is reached a filament of considerable strength and pliability is obtained. In general the synthetic linear superpolymers do not exhibit fiber-forming properties unless the intrinsic viscosity is above 0.4 where intrinsic viscosity is defined as $$\frac{\log_e Nr}{C}$$

wherein Nr is the viscosity of a dilute meta-cresol solution of the polymer divided by the viscosity of meta-cresol in the same units and at the same temperature, and C is the concentration in grams of polymer per 100 cc. of solution. The filaments of these polymers are capable of being cold drawn into oriented fibers, that is, the filaments upon application of tensile stress in the solid state yield strong useful textile fibers which upon X-ray examination exhibit molecular orientation along the fiber axis. Molecularly oriented films, ribbons and the like may be also obtained by cold working (application of compressive stress) as in the cold rolling of films, ribbons, sheets, and the like. Cold rolling improves the toughness, stiffness, the modulus of elasticity, and the tensile strength of the products.

The polymers described in the above mentioned patents include polyesters, e. g., those obtained from dibasic acids and glycols, polycarbonamides obtained from diamines and dicarboxylic acids or amide-forming derivatives thereof, and polyacetals. The mention of bifunctional reactants does not necessarily mean two different bifunctional compounds but includes such compounds in which molecules of the same substance combined to bring about linear polymerization, as for instance in the polymerizations of amino acids or their amide-forming derivatives such as omega-caprolactam to polyamides, in the production of polyethers from glycols.

Other examples of these linear fiber-forming polymers are the polythioureas obtained by the reaction of a diamine and a diisothiocyanate, polyureas obtained by the reaction of a diamine and a diurethane and by the reaction of a diamine and a diisocyanate, polycarbamates and polythiocarbamates obtained by reaction of a diisocyanate or a diisothiocyanate and a diol such as dihydric alcohol, a dihydric phenol, or a dithiol.

The above mentioned polymers are almost invariably crystalline rather than resinous, their microcrystalline nature being evidenced by their sharp melting point and the type of diffraction patterns which they furnish upon X-ray examination.

Since the synthetic linear superpolymers melt sharply, and without appreciable decomposition, it is possible to form the film base, or sheets from which the films are cut, directly from the molten polymers. In order to insure the uniform production of clear films, the films obtained from the molten polymers are preferably tempered by rapidly chilling. For this purpose the polymer can be extruded as a sheet into a cooling atmosphere or into a suitable quenching liquid, such as water or other inert non-solvent for the polyamide. For example, the polymer can be cast in sheet form onto a cool metal surface, or it can be formed into a sheet by rolling between metal rolls.

In many instances it is found advantageous to subject the films thus formed to one or more operations designed to improve the physical properties of the films. One such operation is that of cold working, previously referred to, wherein compressive stress is applied to the solid polymer, causing it to flow in a preferred direction. A convenient method for carrying out the process of cold working consists in passing the film of the polymer between "cold rolls," i. e., at temperatures substantially below the melting point of the polymer. Another operation ("setting") often found of value consists in subjecting the films under tension to the action of heat with or without simultaneous action of a non-solvent mild swelling agent for the polymer, e. g., water, steam or alcohol, and allowing it to cool under the continued application of tension.

Suitable reversible film-forming organic colloids capable of showing high viscosity characteristics and appreciable jelly strength, which may be used in the subbing composition include proteins and their derivatives, such as gelatin, glue, casein, zein, albumin, soy bean protein, and degraded gelatin; other naturally occurring colloids, such as agar-agar, Irish moss, pectin, starch, shellac, and rosin; cellulose derivatives, such as cellulose acetate, cellulose nitrate, and ethyl cellulose; a wide variety of synthetic polymers, including linear superpolymers, such as polyhexamethylene adipamide and polytriglycol adipamide; polyvinyl alcohol and its derivatives, such as polyvinyl esters and polyvinyl acetals; polyacids and their derivatives, such as polymethacrylic acid and styrene-maleic anhydride interpolymer; poly-n-butyl methacrylate; and alkyd resins. Preferred members of these classes comprise those colloids which are water-soluble, or water-sensitive, such as gelatin, zein, agar-agar, cellulose acetate, polytriglycol adipamide, polyvinyl alcohol, and styrene-maleic anhydride interpolymer. Gelatin has been found to be the most generally useful material and can be used either alone or in conjunction with other colloids.

Among the useful monohydric phenols are monohydroxybenzene, alkyl substituted hydroxybenzenes, including normal secondary, tertiary, branched chain and isoalkyl substituted, methoxy and ethoxy hydroxybenzenes, etc. Suitable compounds include o-, m-, and p-cresol, o-, m-, and p-ethylhydroxybenzenes, diamylhydroxybenzenes, 2:3-dimethylphenol, 3:4-dimethylphenol, 2:6-dimethylphenol, 2:4-dimethylphenol, 3:5-dimethylphenol, 2:5-dimethylphenol, thymol, guaiacol, eugenol, etc., 2-methoxy-4-methylphenol, methyl salicylate, o-hydroxydiphenyl. One or more of such compounds can be used.

The amount of the above-mentioned materials which may be present in the subbing compositions may vary over a fairly wide range. For example, the phenol may be present in an amount from about 0.5 to about 20% and preferably from 10 to 15%, the reversible colloid from about 0.2 to 5% and preferably 0.5 to 1.5% and the balance substantially an organic solvent or mixture of such solvents for the phenol which may be admixed with water. Aqueous solutions constitute an important aspect of the invention. In the aqueous compositions the water may be present in amounts from 5 to 30% and preferably 10 to 20%, and the organic solvent from about 40 to 80% and preferably 45 to 75%. All proportions are by weight.

Various types of stabilizing agents can be used in the subbing compositions, e. g., formic, benzoic, salicylic, tartaric, maleic, salicyclic and citric acids. Plasticizers for the reversible colloids, especially the superpolymers and synthetic resins, such as glycerine and ethylene glycol, may also be employed.

While the invention is particularly concerned with adhering radiation sensitive silver halide layers to the superpolymer film bases, it is not limited to that important and preferred aspect. On the contrary (1) heat sensitive layers of silver or mercurous oxalate in gelatin, (2) light sensitive diazo dye layers, (3) fulgides, i. e., anhydrides of fulgenic acids which are particularly sensitive to ultraviolet radiations, (4) antihalation layers, (5) light screening layers, (6) bichromated hydrophilic colloids, (7) dye component layers utilizing organic reversible colloid binding agents, etc. may be attached to the subbing layers hereof.

Suitable elements of the above described type are illustrated in the accompanying drawing wherein.

Figure 1:
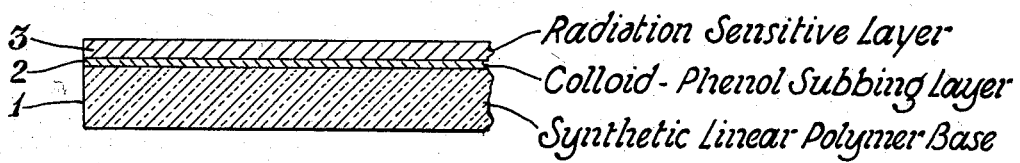
Figure 1 is a cross sectional view on an enlarged scale of one type of such element.
Figure 2:
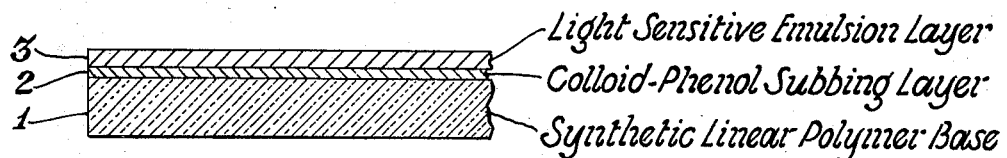
Figure 2 is a cross sectional view on an enlarged scale of a similar element.
Figure 3:
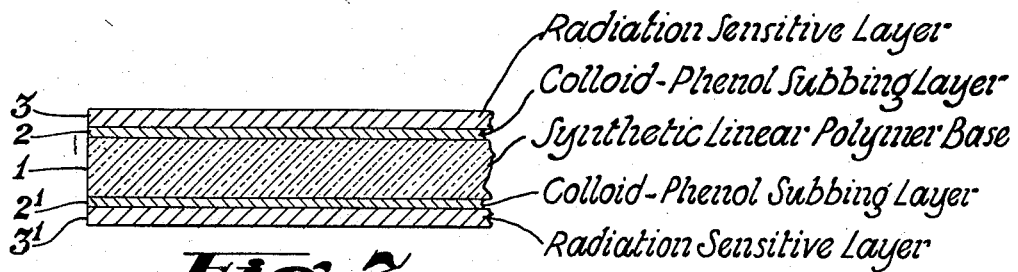
Figure 3 is a cross sectional view on an enlarged scale of another type of element having a light sensitive layer on each side of the base.

In the drawing the reference numeral 1 in each of the views refers to a base or support composed of a synthetic linear polymer of the type described herein. Numeral 2 is a subbing layer or coating deposited from a solution containing a phenol, a film forming colloid, and an organic solvent for the phenol. Layer 3 is a radiation sensitive layer deposited on said layer 2. In Figure 3 layers 2' and 3' correspond to layers 2 and 3, respectively, of Figures 1, 2, and 3.

The invention will be further illustrated but is not intended to be limited by the following examples.

*Example I*

Polyhexamethylene adipamide, of intrinsic viscosity 1.12, was extruded through forming rolls into cold water, polished, streamed and dried. The resulting film was then subcoated by beading on a solution containing the following ingredients:

| | Parts |
|---|---|
| Gelatin | 5 |
| Glycerol-1,3-dichlorhydrin | 30 |
| Phenol | 6 |
| Methanol | 224 |
| Acetone | 440 |
| Formaldehyde | 0.6 |

After drying the film was coated with a positive-type silver-gelatino halide emulsion. After exposure and development the emulsion layer adhered tenaciously to the superpolymer film support.

*Example II*

A film base was prepared from interpolymer by heating equimolecular proportions of the adipic acid salt of hexamethylene diamine and the sebacic acid salt of decamethylene diamine for three hours under condensation polymerization conditions at 250° C. and extruding the polymer into cold water. This film was then sub-coated with a mixture of 1.8% gelatin, 3.8% cellulose acetate, 14.2% cresol, 30% methyl alcohol, 6.2% water and acetone in suitable proportions. After drying the sub film base was then coated with a panchromatized silver-gelatino bromide emulsion layer of 120 milligrams coating weight per decimeter. After exposure and development the emulsion layer was firmly anchored to the film support even in the wet condition.

*Example III*

Polydecamethylene carbamate having a melting point of 145° C., and an intrinsic viscosity of 0.61 was hot pressed to form a clear, colorless film, having a tensile strength of 4800 lbs./square inch based on the original dimensions. After coating on each side with a sub-coat comprising a mixture of 2 parts of phenol and 50 parts of a gelatin-cellulose acetate subcoat comprising a solution containing 1.8% gelatin and acetone, methyl alcohol, water and acetic acid in suitable proportions, the film was coated on each side with a gelatin-silver bromide emulsion suitable for radiography. Satisfactory anchorage of the emulsion to the film base was obtained after exposure and development of the film in an X-ray developer.

*Example IV*

An interpolymer containing 50% hexamethylene adipamide and 50% ethylene glycol sebacate melting at 158° C. was extruded into cold water to form a film. After subbing with a mixture of 2 parts of phenol and 50 parts of a gelatin-cellulose acetate sub-coat comprising a solution containing 1.8% gelatin and acetone, methyl alcohol, water and acetic acid in suitable proportions, the film was coated with a gelatin-silver bromide emulsion. Excellent anchorage of the emulsion to the film base was obtained.

In place of the specific coating solutions set forth in the above examples may be substituted the following:

*Example V*

| | Parts |
|---|---|
| Gelatin | 1.0 |
| Formic acid | 5.0 |
| m-Cresol | 10.0 |
| Methanol | 84.0 |

*Example VI*

| | Parts |
|---|---|
| Gelatin | 1.0 |
| Formic acid | 5.0 |
| Thymol | 10.0 |
| Methanol | 84.0 |

*Example VII*

| | Parts |
|---|---|
| Gelatin | 1.0 |
| o-Cresol | 15.0 |
| Water | 10.0 |
| Methanol | 73.6 |
| Salicylic acid | 0.2 |
| N-(n-butyl)-salicylamide | 1.0 |

*Example VIII*

| | Parts |
|---|---|
| Gelatin | 2.0 |
| p-Tertiaryamyl-o-cresol | 5.0 |
| Water | 10.0 |
| Ethanol (about 4% water) | 80.0 |

*Example IX*

| | Parts |
|---|---|
| Gelatin | 1.5 |
| Water | 15.0 |
| Salicylic acid | 0.3 |
| Ethanol (anhydrous) | 75.0 |
| Diamyl phenol | 5.0 |

Example X

| | Grams |
|---|---|
| p-Toluenesulfonamide-formaldehyde resin | 2 |
| Ethanol | 60 |
| Water | 25 |
| m-Cresol | 15 |

Example XI

| | Grams |
|---|---|
| Methyacrylic acid-methacrolein interpolymer | 3 |
| m-Cresol | 15 |
| Ethanol | 85 |

Example XII

| | Grams |
|---|---|
| Cyclohexane sulfonamide-formaldehyde resin | 5 |
| m-Cresol | 12 |
| Methanol | 230 |
| Acetone | 400 |

Example XIII

A film prepared from an interpolymer of hexamethylene adipamide and ethylene adipate of 70% ester content, melting at 140° C., and having an intrinsic viscosity of 0.57 was extruded between forming rolls into cold water. The extruded film was cold rolled to 100% elongation. A substratum layer was applied by beading on a coating from a solution as given in Example XII above. On the substratum is coated a light-sensitized bichromated polyvinyl alcohol layer. The polymeric vinyl alcohol $(CH_2CHOH)_n$ is one selected to have $n$ about 300. Five percent of the polyvinyl alcohol is digested in water at 170° F. and a 4% solution of ammonium bichromate is added in the proportion of 4 parts of ammonium bichromate to 40 parts of dispersed polyvinyl alcohol solution. The sensitized polyvinyl alcohol is coated onto the substratum layer by well known methods. Instead of the ordinary bichromatized polyvinyl alcohol as described there may be added to the sensitized solution before coating, agents for improving the ink receptivity life of the finished lithographic film. Such agents include maleic anhydride, sebacic acid, 1:5-naphthalene disulfonic acid, saccharin, ammonium and sodium linoleates and are added in amounts ranging from about 1 to 18% of the weight of polyvinyl alcohol.

Example XIV

A film support of polyhexamethylene adipamide, prepared from a polymer of intrinsic viscosity 1.01, by extrusion into cold water, was cold rolled from a thickness of 0.023 in. to 0.0064 in. thickness and steamed at 100° C. for three hours under tension. The resulting film was given a sub-stratum coating from a solution of:

| | Grams |
|---|---|
| Polyhexamethylene adipamide-caprolactam interpolymer | 2.0 |
| Ethanol | 70.0 |
| m-Cresol | 15.0 |
| Water | 13.0 |

On the dried subbing layer was coated a layer of lead chloride in gelatin. The completed film is substantially insensitive to diffuse daylight, but is quite sensitive to ultra-violet, infra-red and X-ray radiations.

Example XV

A film prepared from the interpolymer resin described under Example II is provided with a composite substratum layer beaded on from a solution of:

| | Grams |
|---|---|
| Poly-triglycol-adipamide | 1.5 |
| Ethanol | 60.0 |
| m-Cresol | 15.0 |
| Water | 25.0 |

Over this is applied a thin coating of gelatin by beading on a solution of 0.75 gram of gelatin dispersed in 100 grams of water. On the substratum layer is coated an 8% gelatin solution containing 0.01% of the silver salt of 6:6'-dinitro-o-tolidine-dioxamic acid. The dried sensitive film is exposed under a stencil pattern or negative to direct sunlight until a strong image is obtained. The silver image split away by the exposure is fixed out in a 1% potassium cyanide solution leaving a red dye image.

The subbing compositions of the above examples can be applied by spreading, beading, dipping, transfer roll, floating, etc., methods.

The light-sensitive layer or layers as stated above may vary somewhat in their chemical constitution and are preferably silver halides. They may be simple or mixed and have various types of binding agents. As examples of practical coatings, mention is made of silver chloride, silver bromide, silver-chloro bromide, silver iodo bromide, gelatin emulsions. Various emulsion components such as sensitizing dyes, desensitizing dyes, fog inhibitors, emulsion stabilizers, color dyes, light screening dyes and pigments may be present in such layers. It has been found that these layers adhere satisfactorily to the subbed superpolymer film base.

Color formers of the immobile type which are suitable for use in the above light sensitive layers in general contain groups which are capable of reacting or coupling under conditions of development with the color forming or coupling developers to form quinoneimine including indophenol, indoaniline and indamine dyes or azomethine and/or azo dyes. Suitable dye intermediates as well as color forming developers are described in U. S. Patents 2,154,918, 2,166,181, 2,178,612, 2,179,228, 2,179,238, 2,179,239, 2,179,244, 2,186,045, 2,186,719, 2,186,734, 2,186,735, 2,186,736, 2,186,849, 2,140,540, 2,133,937, 2,200,924, 2,189,817, and many others are available.

The novel film elements of this invention which contain the above-described substratums are not restricted to any one type, or for any one purpose. On the contrary, cut or roll film for still or motion picture photography or radiographic purposes; perforated positive and negative motion picture film stock, including film having a single sensitive layer for black and white pictures or film having a plurality of sensitive layers for color pictures or transparencies; stripping films, etc. are comprehended by the invention.

The elements being thin, water-resistant, non-inflammable, and as compared with cellulose acetate film exhibiting a marked increased in life when subjected to mechanical forces, e. g., wear of projection, have considerable utility. In addition, the films containing the novel substratums hereof have excellent flexibility properties, are free from brittleness and are resistant to stripping actions, that is, the substratums exhibit good anchorage.

The photographic films of this invention possess many outstanding advantages. They are in general characterized by extreme strength, good flexibility, good water-resistance, and absence of fire hazard, a combination of properties not possessed by the nitrocellulose or cellulose acetate films. The great strength of the present films manifests itself, in the case of cinematographic films, in a large increase in the life of films continually exposed to wear of projection. A further manifestation of this strength is the fact that it is possible to use films of the order of 0.002" to 0.003" thickness, which is of the order of one-half of the thickness of the films previously used, without decreasing the wear resistance of the film element. This is not only an economic advantage but also an advantage in utility and convenience since it is possible to prepare photographic films of less weight and to increase the footage per roll. Furthermore, the use of thin films is of extreme practical importance in connection with processes of color photography for it makes feasible the coating of emulsions on opposite sides of the support without causing distortion of the subsequent picture due to the intervening layer of film base. This unique property makes the films of the present invention especially advantageous in the preparation of films for color photography. In place of multilayer coatings on a single film base, thin films of the herein described synthetic linear superpolymers may be used in a tripack arrangement of films where image distortion due to the separation of two of the sensitive emulsions by one of the film bases is thus reduced to a surprising minimum.

Extremely thin films of these polymers make possible stripping emulsion films and papers, particularly useful in the photomechanical and color photography fields. For example, a doubleweight, photographic paper stock, water-proofed in the well known manner, is coated on one side with a water-soluble agglutinant such as refined glue or casein. When partially dry, the agglutinant surface is brought into contact with a similarly coated agglutinant surface of a thin film of the superpolymer approximately 0.0008" in thickness. The laminated combination is held under pressure until the cementation of the agglutinant is firm and then dried. After drying, the film surface is subbed as indicated in the previous examples and then coated with a layer of a silver-gelatino-halide emulsion. After exposure, developing, fixing and, if desired, subsequent coloring, the emulsion layer and its thin support can be stripped while wet from the temporary paper base and transferred to a permanent support.

The films of this invention, as has been pointed out above, burn with great difficulty and, even when placed in a flame, show none of the violent burning associated with cellulose nitrate. In most cases the films melt into globules of polymer which burn very slowly or not at all and, when removed from the flame, die out spontaneously.

It is to be understood that the expression "base," "film base," "support" as used in the specification and claims is to include not only a single unit-layer composition of the polymers thereof but such a layer coated with a waterproofing layer or strata on one or both sides of the layer, and also laminated films wherein a polymer layer forms an outer layer which may carry a waterproofing layer.

It will be apparent from the foregoing description that the new photographic films described herein possess a combination of properties ideally suited for their use as supports for light-sensitive or radiation-sensitive layers. No limitations appear to exist upon their use in the photographic and photomechanical industries. That is, they can be used with the advantages outlined above in cut or roll film, in amateur and professional cinematography, the permanent recording of documents, X-ray diagnosis, color photography, and sound recording.

As many apparently widely different embodiments of this invention may be made without departing from the spirit and scope thereof, it is to be understood that the invention is not limited to the specific embodiments thereof except as defined in the appended claims.

I claim:

1. A film element comprising a base composed essentially of a fusible, water-insoluble, synthetic linear polymer which has intralinear hetero-atoms and which is capable of being formed into fibers showing by characteristic X-ray patterns orientation along the fiber axis, having superposed thereon at least one layer comprising a film forming organic colloid and a phenol.

2. A film element comprising a base composed essentially of a fusible, water-insoluble, synthetic linear polymer which has intralinear hetero-atoms and which is capable of being formed into fibers showing by characteristic X-ray patterns orientation along the fiber axis, having superposed thereon at least one layer comprising a reversible film forming organic colloid and a monohydric phenol, said layer having imposed thereon a water permeable layer containing a photographic-responsive material.

3. A film element comprising a base composed essentially of a fusible, water-insoluble, synthetic linear polymer which has intralinear hetero-atoms and which is capable of being formed into fibers showing by characteristic X-ray patterns orientation along the fiber axis, having superposed thereon at least one layer comprising a reversible film forming organic colloid, a stabilizer, and a monohydric phenol, said layer having imposed thereon a water permeable layer containing a photographic-responsive material.

4. A film element comprising a smooth, transparent film base composed essentially of a fusible, water-insoluble, synthetic linear polymer having intralinear hetero-atoms capable of being formed into fibers showing by characteristic X-ray patterns orientation along the fiber axis having imposed thereon at least one layer comprising essentially from 0.05 to 1 part of a reversible film forming colloid per part of a monohydric phenol of at least 7 carbon atoms, said layer carrying at least one layer composed essentially of a reversible film forming colloid.

5. A film element comprising a smooth, transparent film base composed essentially of a fusible linear polyamide capable of being formed into fibers showing by characteristic X-ray patterns orientation along the fiber axis having superposed directly thereon at least one layer comprising a reversible film forming colloid and a monohydric phenol, said layer having imposed thereon a water permeable layer containing a photographic-responsive material.

6. A film element as set forth in claim 5 wherein said colloid is gelatin and said phenol is metacresol.

7. A film element comprising a smooth, transparent film base composed essentially of a fusible linear polyamide capable of being formed into fibers showing by characteristic X-ray patterns orientation along the fiber axis having superposed directly thereon at least one layer comprising a reversible film forming colloid, a stabilizer, and a monohydric phenol, said layer having imposed thereon a water permeable layer containing a photographic-responsive material.

8. An element as set forth in claim 7 wherein said stabilizer is formic acid.

9. A film element comprising a smooth, transparent film base composed essentially of a fusible linear polyamide capable of being formed into fibers showing by characteristic X-ray patterns orientation along the fiber axis having imposed directly thereon at least one layer comprising a reversible film forming colloid and a monohydric phenol, and a radiation sensitive layer superimposed directly on said layer.

10. A film element as set forth in claim 9 wherein said radiation sensitive layer is a silver halide layer.

11. A film subbing composition comprising essentially from 0.5 to 20% of a monohydric phenol having at least 7 carbon atoms, 0.2 to 5% of a film-forming reversible colloid, from 5 to 30% of water and 40 to 80% of a saturated monohydric aliphatic alcohol.

12. A composition as set forth in claim 11 wherein said phenol is meta-cresol and said colloid is gelatin.

13. The process which comprises depositing on a smooth transparent film base composed essentially of a fusible, water-insoluble, synthetic linear polymer having intralinear hetero-atoms capable of being formed into fibers showing by characteristic X-ray patterns orientation along the fiber axis, a thin layer from a solution comprising a phenol, a reversible film-forming colloid, water and an organic solvent for said phenol.

14. The process which comprises depositing on a smooth, transparent film base composed essentially of a fusible, water-insoluble, synthetic linear polyamide capable of being formed into fibers showing by characteristic X-ray patterns orientation along the fiber axis, a thin layer from a solution comprising a phenol, a reversible film-forming colloid, water and an organic solvent for said phenol and depositing on such layer a water permeable layer containing a photographic-responsive material.

15. The process which comprises depositing on a smooth, transparent film base composed essentially of a fusible, water-insoluble, synthetic linear polyamide capable of being formed into fibers showing by characteristic X-ray patterns orientation along the fiber axis, a thin layer from a solution comprising essentially from 5 to 20% of a monohydric phenol having at least 7 carbon atoms, 0.2 to 5% of a film-forming reversible colloid, from 5 to 30% of water and 40 to 80% of a saturated monohydric aliphatic alcohol.

16. A process as set forth in claim 15 wherein said phenol is meta-cresol and said colloid is gelatin.

EDMUND B. MIDDLETON.
DAVID M. McQUEEN.
JOHN R. HILL.